3,013,043
PROCESS FOR THE REACTION OF HALOGENOUS ORGANIC ALUMINIUM COMPOUNDS WITH OLEFINS

Karl Ziegler, Kaiser Wilhelm Platz 1, Mulheim (Ruhr), Germany, and Roland Köster, Mulheim (Ruhr), and Wolf-Rainer Kroll, Witten, Annen, Germany; said Köster and said Kroll assignors to said Ziegler
No Drawing. Filed Feb. 27, 1959, Ser. No. 795,901
Claims priority, application Germany Feb. 28, 1958
16 Claims. (Cl. 260—448)

This invention relates to a process for the reaction of halogeneous organic aluminum compounds with olefines.

Aluminum trialkyls, in the presence of olefines, exchange their hydrocarbon fractions for those of the olefines employed, so that olefines corresponding to the hydrocarbon radicals originally present in the aluminum trialkyls are formed. Such an exchange frequently occurs spontaneously, but can also be accelerated by certain catalysts. Examples of such a reaction are as follows:

If aluminum triisobutyl is boiled with 2-ethyl-1-hexene, isobutylene is split off and aluminum tri-(2-ethylhexyl) is formed quantitatively:

$$Al(iso-C_4H_9)_3 + 3H_2C=C(C_2H_5)C_4H_9$$
$$\rightarrow Al-(CH_2-CH(C_2H_5)C_4H_9)_3$$
$$+ 3 (CH_3)_2C=CH_2$$

The olefine cleavage proceeds spontaneously at the boiling point of the olefine, which is approximately 120° C.

It is quite generally the case that mixtures of aluminum hydrocarbons, and more especially aluminum trialkyls, form equilibrium systems of the following type with olefines Al(alkyl I)$_3$+3 olefine II⇌Al(alkyl II)$_3$+3 olefine I, it being possible to accelrate adjustment to equilibrium by the use of catalysts. Depending on the precise reaction conditions, it is possible for the equilibrium to be shifted in one direction or the other. For example, if the olefine II is used in excess, predominantly Al (alkyl II)$_3$ is formed in the final product; if the olefine I is in excess, the converse is the case. If one of the two olefines participating in the establishment of the equilibrium is more readily volatile than the other it is normally possible by removal of this more readily volatile olefine to obtain as the final condition that aluminum trialkyl having alkyl radicals corresponding to the less readily volatile olefine. It is possible to split off higher olefines from aluminum trialkyls with ethylene if the ethylene is used in excess. Conversely, it is of course just as readily possible to produce higher aluminum alkyls and ethylene from aluminum triethyl and higher olefines when an excess of ethylene is not used and provision is made for the constant escape of ethylene.

These possibilities of conversion of the aluminum trialkyls can be utilized technically in many different ways by suitable combination with other reactions.

Furthermore, it is known that aluminum hydrocarbons can be converted by reaction with ethylene into higher homologues in accordance with the following equation:

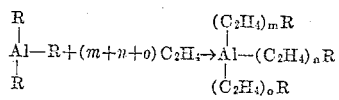

in which the several radicals R can be the same or different.

This reaction is suitable, for example, to convert aluminum triethyl into a statistical mixture of higher aluminum trialkyls, the average molecular weight of which depends on the number of mols of ethylene used per aluminum atom. The higher aluminum alkyls prepared in this way can be employed as intermediates in the preparation of other valuable straight-chain compounds, for example, on hydrolysis they yield hydrocarbons and on oxidation they yield straight-chain primary fatty alcohols.

In this synthesis of higher aluminum hydrocarbons with ethylene, it is in certain circumstances possible to use organic aluminum compounds in which one valency is bonded to hydrogen. By using such a compound, one mole of ethylene is added in the first place to the aluminum-hydrogen bond, so that once again an aluminum compound in which the three valencies of aluminum are bonded to carbon is formed.

The reactions described above are possible only with those compounds in which all three valencies of the aluminum are bonded to carbon. Aluminum compounds in which only two valencies of the aluminum are bonded to carbon and the third valency is bonded to any other arbitrary atom Y do not undergo this alkyl interchange with olefines. For example, aluminum diisobutyl chloride can be boiled for hours with 2-ethyl-1-hexene without isobutylene escaping. The different technical possibilities which arise from the olefine-alkyl exchange could hitherto not be made use of in the case of aluminum compounds in which only two, or even only one, valency is bonded to carbon and the other or others to halogen. It was equally not possible hitherto to react such compounds with ethylene to form higher homologous compounds of the general formula XAl[(C$_2$H$_4$)$_n$R]$_2$, in which R represents any desired hydrocarbon radical and X represents a halogen atom.

It has now been found that conversions of organic aluminum compounds with olefines can also be effected in the case of organic aluminum compounds of the general formula XAlR$_2$, in which X represents a halogen atom, advantageously chlorine, and each R represents any desired hydrocarbon radical which does not contain any unsaturated bond on the carbon atom bonded to aluminum, advantageously an aliphatic or aromatic, substituted or unsubstituted, hydrocarbon radical, by effecting reaction in the presence of an aluminum compound which contains three valencies bonded to carbon or in the presence of a dialkyl aluminum hydride or aluminum hydride.

The radicals R can be aliphatic, isocyclic, hydroaromatic, mixed aliphatic-isocyclic, mixed hydroaromatic, substituted or unsubstituted aromatic, mixed aliphatic-aromatic or mixed aromatic-hydroaromatic hydrocarbon radicals.

The reaction of compounds of the general formula XAl(C$_2$H$_5$)$_2$ with ethylene in accordance with the process of the invention renders the synthesis of higher organic aluminum compounds possible. If compounds of the general formula XAlR$_2$ are reacted with ethylene at pressures higher than 10 atm., advantageously at temperatures between 90 and 170° C., and more especially between 120 and 150° C., substantially higher homologues of the organic aluminum starting compound are obtained. By raising the reaction temperature above 170° C., it is possible to split off olefines from the organic aluminum compounds which are formed, if this should be desired.

According to another modification of the process, it is possible to start with an aluminum compound of the general formula XAlR$_2$, in which at least one radical R is a higher radical than C$_2$H$_5$, and to react such compound with ethylene, for example at ordinary pressure, in which case olefines other than ethylene are obtained, in addition to lower or higher homologues of the starting compound.

It is of course also possible to react higher olefines than ethylene with the organic aluminum starting compound. In this case, the olefine corresponding to the radical R is obtained as an end product, in addition to a lower or higher homologue of the starting compound $XAlR_2$.

The catalysts suitable for use according to the invention are not operative when using aluminum compounds of the general formula $X_2AlR$. This is due to the fact that a reaction according to the equation $$X_2AlR + AlR_3 = 2XAlR_2$$

is always possible between an aluminum trialkyl and a compound of the type $X_2AlR$. The aluminum trialkyl thus does not remain as such in the reaction mixture together with the compound of the type $X_2AlR$ and therefore it cannot act as a catalyst. It is only when the added quantity of the true aluminum trialkyl exceeds the equivalent quantity that the reaction with olefines is possible, but then it is no longer possible to think in terms of small quantities of the aluminum trialkyl and the reaction products, for example with ethylene, would also no longer have the structure $X_2Al(C_2H_4)_nR$ but would be formed in accordance with the formula $$XAl[(C_2H_4)_nR]_2$$

On the contrary, according to the invention it is possible for compounds of the type $XAlR_2$ to be transformed by the action of an olefine to exactly the same degree and with the same opportunities of variations into other substances of the same structure, but with different alkyl groups, such as hitherto was possible only in respect of those aluminum compounds in which all 3 valencies are bonded to carbon. This possibility is of particular technical importance in connection with the synthesis of higher straight-chain aliphatic compounds from ethylene.

The halogen compounds of the type $$XAl[(C_2H_4)_nR]_2,$$

such as can be obtained for example from diethyl aluminum chloride and ethylene, are also of technical importance per se, since they constitute valuable components for "Ziegler catalysts" for use in the polymerization of olefines.

When carrying the process of the invention into effect, it is frequently necessary for the catalyst employed to be inactivated again. This is advantageously effected by adding to the reaction mixture that aluminum halide the halogen of which corresponds to that of the starting material. It is, however, equally possible to use the corresponding aluminum alkyl dihalide or sesquihalide. The course of the reaction can be expressed by the following equations:

$$2AlR_3 + AlX_3 = 3AlR_2X$$
$$AlR_3 + AlRX_2 = 2AlR_2X$$
$$AlR_3 + [AlRX_2 \cdot AlR_2X] = 3AlR_2X$$

wherein X and R have the same meanings as indicated above.

Very many other ways of inactivating the catalysts exist. Any reaction which transforms one of the 3 aluminum-carbon bonds into a different type of bond is suitable. The only exception is the aluminum-hydrogen bond: this must be regarded as equivalent to the aluminum-carbon bond.

When the true aluminum trialkyl in the reaction mixture has been inactivated in the manner described above, the reaction mixture can be separated by distillation into its components without any danger of further reaction. These great advantages as compared with previously available reactions are obtained solely at the expense of the loss, during the continuous production of olefines from ethylene, of the small quantity of true organic aluminum compound necessary at any time as catalyst. Since it is however possible to manage with very small quantities of catalyst, this loss can comfortably be accepted.

Very small quantities of catalyst are sufficient when carrying out the reaction in accordance with the invention, but the speed of the reactions naturally depends on the amount of catalyst present. Adequate speeds can be produced with 1–5% of the catalytic organic aluminum compound, but this does not preclude the possibility of using either smaller or larger quantities of catalyst. In addition, the amount of catalyst which is required also depends on the purity of the olefine used. Certain impurities in the olefine, such as $CO_2$ or acetylene, react with the aluminum trialkyl added as catalyst and renders it ineffective. Consequently, it can happen that the reaction in accordance with the invention comes to a stop after a certain time. In such cases, the reaction can be restarted by the addition of more of the catalytic organic aluminum compound. It can readily be seen, in the light of the foregoing discussion, that the quantity of catalyst required has to be adjusted according to the degree of purity of the olefine used. These considerations are more especially to be taken into account in the synthesis of higher dialkyl aluminum halides from low dialkyl aluminum halides, using ethylene.

In this synthesis, the quantity of ethylene which may be reacted in accordance with the invention is practically unlimited. By using only a few mols of ethylene per mol of aluminum compound, it is possible to obtain reaction products which still contain alkyl radicals of fairly low molecular weight, for example butyl, hexyl or octyl radicals when starting from ethyl aluminum compounds, but compounds with dodecyl, tetradecyl, hexadecyl, octadecyl and higher radicals on the aluminum atom can also be obtained by using more ethylene. If the quantity of ethylene is raised still further, substances having very long-chain molecules on the aluminum atom i.e. of about 30–60 carbon atoms and even higher, are finally obtained. Olefines are also obtained as secondary products, but the quantity thereof can be limited if the reaction temperatures are not raised substantially above 150° C.

This modification of the process according to the invention has a number of advantages over hitherto known techniques. Like the true aluminum trialkyls, the aluminum compounds which are obtained are valuable intermediates for the production of a number of other compounds. By oxidation, the products obtained by the process of the invention can be transformed into halogen-aluminum alcoholates and thence into alcohols, as is similarly the case in respect of for example, aluminum trialkyls prepared by the process of German Patent No. 961,537.

An additional advantage of the synthesis reaction according to the invention resides in the fact that the hitherto available synthesis reactions starting from aluminum triethyl or other aluminum trialkyl proceed only at a moderate rate. The yield per unit of volume and time is not very great with the usual experimental temperatures of 100–120° C. If an attempt is made to raise the temperature this can, on the one hand, lead to an explosive deterioration, in the course of which the ethylene forced in under pressure largely decomposes into carbon and hydrogen. At higher temperatures, olefine cleavage assumes a greater scale and the reaction products then contain considerable quantities of α-olefines. However, these olefines are then in contact with aluminum alkyls at relatively low temperatures, and are dimerized in known manner, so that the normal synthesis reaction of the aluminum triethyl with ethylene no longer leads to homogeneous straight-chain compounds when it is desired to carry out the reaction at temperatures substantially above 120° C.; the secondarily formed branched dimeric olefines have a considerable disturbing effect.

On the other hand, if an aluminum compound of the type $XAlR_2$ is taken and if, for example, a small quantity of an aluminum trialkyl is added thereto as catalyst, then of course the reaction velocity in the reaction with ethylene is initially still further reduced, since only the small proportion of aluminum trialkyl has a speed-determining effect on this addition reaction. This reduction can however now be compensated or over-compensated for in a convenient manner by raising the temperature suitably, because the major part of the aluminum compounds formed in the reactor is in fact progressively present in that form of the type XAlR$_2$ which is inert with respect to olefines. Even if olefine is split off, this only matches the small quantities of the pure aluminum trialkyls used as catalysts and the dimerization consequently cannot assume any great scale.

The following examples further illustrate the invention:

Example 1

20 g. of dipropyl aluminum chloride are placed in a 200 cc. autoclave previously flushed with nitrogen and then 45 g. of dry air-free ethylene are forced in under pressure. The filled autoclave is now heated to 150° C. while shaking, a pressure of about 200 atm. gauge being adjusted, which pressure does not change even on heating for several hours. After cooling, another 13 g. of dipropyl aluminum chloride mixed with 3.5 g. of aluminum tripropyl are forced in by means of a liquid injection pump. If heating is continued while shaking, a distinct drop in pressure becomes noticeable from 120° C. At 150° C. the pressure drops in 4 hours to 15 atm.

The autoclave is allowed to cool, the residual pressure is blown off and the liquid contents of the autoclave are discharged under nitrogen. By heating in vacuo to 70° C. and cooling the receiver, it is possible to extract from these contents 5 g. of a mixture consisting substantially of 1-pentene and 1-heptene. The liquid residue consists of a mixture of dialkyl aluminum chloride of the average composition $[C_3H_7(C_2H_4)_3]_2AlCl$. This can be shown in the following way: the mixture is carefully decomposed with methanol (some propane escaping) and hydrolyzed with dilute sulphuric acid. The oil layer is then washed neutral and distilled, after drying, using a rotating band column. 7 g. of n-pentane, 12 g. of n-heptane, 14 g. of n-nonane, 8 g. of n-undecane and 6 g. of paraffins with an even higher boiling point are obtained. The higher fractions are contaminated by small quantities of straight-chain α-olefines.

If 60 g. of ethylene are reacted during the reaction, a reaction mixture which has the following composition is obtained: 5 g. of n-heptane, 7 g. of no-nonane, 14 g. of n-undecane, 11 g. of n-tridecane, 10 g. of n-pentadecane, 7 g. of n-heptadecane and 10 g. of residue.

Example 2

320 g. of diethyl aluminum chloride and 23 g. of aluminum triethyl are placed in a 2-litre autoclave which has been flushed out with nitrogen, whereupon 450 g. of dry, air-free ethylene are forced in under pressure and the autoclave is heated to 125° C. while shaking. At this temperature, a pressure of 160 atm. is reached, and this has almost completely disappeared within 25 hours. The reaction product now has substantially the composition $C_2H_5[(C_2H_4)_3]AlCl$ (with some of the corresponding aluminum trialkyl in addition). It is a good starting material for the production of α-olefines. It can for example expediently be further processed as follows: after cooling the autoclave to 90° C., the residual gas (about 15 g.) is blown off and 150 mg. of dry pentane in which some nickel acetylacetonate is suspended are immediately introduced and an ethylene supply bottle is connected, the pressure of ethylene being kept constant during the experiment at about 75 atm. While shaking, the autoclave is heated for 1 hour at 90° C., whereby the ethylene required for splitting off the olefine is taken up. Thereafter, the ethylene supply bottle is shut off, the temperature is allowed to fall to room temperature and excess ethylene is blown off, whereby the butene formed in the reaction and small quantities of hexene are also lost.

The liquid contents of the autoclave (940 g.) are emptied out under nitrogen and 26 g. of ethyl aluminum dichloride are added, whereby the aluminum triethyl present is converted into diethyl aluminum monochloride. While slowly heating, such a quantity is distilled off through a Vigreux column that a thermometer immersed in the liquid indicates 110° C. At this stage, the bath temperature is not increased initially, but 230 g. of dry potassium chloride are added in portions to the hot mixture, in which it is then slowly dissolved. With the reaction described above, the potassium chloride is dissolved in the diethyl aluminum chloride with the formation of a complex salt according to the following equation:

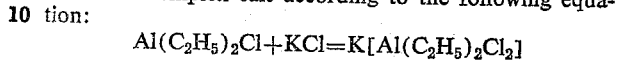

$$Al(C_2H_5)_2Cl + KCl = K[Al(C_2H_5)_2Cl_2]$$

It is only when all the potassium chloride has disappeared that the olefines can be almost completely distilled off from the $K[Al(C_2H_5)_2Cl_2]$ remaining in the flask and be separately subjected to a fine distillation. In this way, 134 g. of 1-hexene, 139 g. of 1-octene, 117 g. of 1-decene, 59 g. of 1-dodecene, 43 g. of 1-tetradecene and 30 g. of residue are obtained.

To recover the diethyl aluminum chloride introduced, the equivalent quantity of ethyl aluminum dichloride is added to the residue and the mixture is heated for 1 hour at 150° C. The mixture is thereby separated into two layers, the lower layer consisting of potassium aluminum ethyl trichloride and the upper layer consisting of diethyl aluminum chloride, which is separated and also returned to the process. The diethyl aluminum chloride can alternatively be distilled off directly from the 2-phase system.

If it is also desired to recover the monoethyl aluminum dichloride, the operation can be repeated with the addition of the equivalent quantity of aluminum chloride. Potassium aluminum tetrachloride is then separated out and monoethyl aluminum dichloride can be distilled off.

Example 3

As described in Example 1, 166 g. of diethyl aluminum bromide with 17 g. of diethyl aluminum hydride are reacted in a 1-litre autoclave with 145 g. of ethylene. At a reaction temperature of 90° C. the pressure falls within 50 hours from 120 to 15 atm. The reaction product now has the average composition

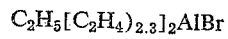

$$C_2H_5[C_2H_4)_{2.3}]_2AlBr$$

(with a small quantity of the corresponding aluminum trialkyl). The practically pure paraffins which are obtained after hydrolysis and fine distillation are as follows: $C_6$: 39 g., $C_8$: 42 g., $C_{10}$: 31 g., $C_{12}$: 20 g., $C_{14}$: 9 g. and 10 g. of residue.

The gases escaping during the hydrolysis are composed of 4 g. of ethane and 21 g. of butane, as can be established by gas chromatography.

Example 4

65 g. of dihexyl-aluminum iodide and 2 g. of aluminum trihexyl are heated to 150° C. in a cylindrical glass vessel with an internal diameter of about 30 mm., while dry air-free propylene is conducted therethrough by means of a glass frit and returned to the cycle at a speed of 40 standard litres per hour. The discharging stream of propylene passes through two cooling traps, cooled to 0° and —30° C. The hexene split off collects preferentially in the second trap, while some aluminum tripropyl is condensed in the first trap and this tripropyl is returned at intervals into the reaction vessel.

Over a period of 10 hours, 31 g. of h-hexene are finally obtained, while 50 g. of dipropyl aluminum iodide remain in the reaction vessel. B.P. 150° C./1 mm. Hg. Found: Al 10.8%, I 52.0%; calculated: Al 11.2%, I 53.0%.

If the reaction is carried out at 180° C., the hexene is completely split off after only three hours. The 1-hexene then contains 5% of 2-hexene and 3-hexene.

Example 5

20 g. of aluminum tributyl are added to 160 g. of dibutyl aluminum fluoride and heated to 170° C. At this temperature, 1-octene vapour is introduced, 1-octene having been brought to boiling point in a separate vessel. The vapour passing through is condensed into a receiver by way of a reflux condenser kept at about 40° C. Immediately after starting the experiment, 1-butene escapes from the receiver and this is collected in a second receiver cooled to —80° C. Over a period of about 2 hours, 2000 g. of octene are distilled through the apparatus, residues of dissolved butene are driven off from the condensed 1-octene by boiling for a short time under reflux and the octene is returned to the vapour generator. After being repeated 2–3 times, no more butene is evolved and the dibutyl aluminum fluoride has changed into 270 g. of dioctyl aluminum fluoride mixed with 36 g. of aluminum trioctyl.

Diisobutyl aluminum fluoride in the presence of aluminum triisobutyl can be converted into the said reaction products in about 6 hours and in an even simpler manner by heating under reflux with excess of 1-octene (internal temperature 125° C.) the escaping isobutene is collected at the head of the reflux condenser and excess 1-octene is distilled off at the end of the reaction.

*Example 6*

176 g. of diisobutyl aluminum monochloride are mixed in the absence of air with about 15 g. of aluminum triisobutyl. The mixture is dissolved in 1-litre of 1-vinyl-3-cyclohexene and boiled under reflux until no more isobutylene escapes, this taking a few hours. Thereafter, excess 1-vinyl-3-cyclohexene is withdrawn in a good vacuum at a bath temperature of 50° C. The residue consists of substantially 90% of a dialkyl aluminum monochloride of the formula

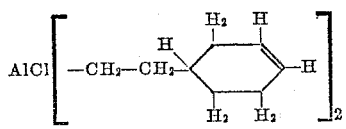

and about 10% of an aluminum trialkyl of the formula

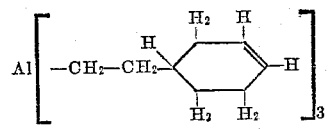

41 g. of this mixture are placed in a 200 cc. autoclave which had been flushed out beforehand with nitrogen. 19 g. of ethylene are then forced in under pressure and the autoclave is heated while shaking to 140° C. A pressure of 110 atm. is adjusted and this falls within 7 hours to 24 atm.

After cooling to 100° C., the residual gas (about 4 g.) is blown off and the liquid contents of the autoclave are discharged in a nitrogen atmosphere. By heating in vacuo to 50° C. and cooling the receiver, it is possible to distill off therefrom 5 g. of a hydrocarbon mixture consisting essentially of 1-vinyl-3-cyclohexene, 1-hexene and 1-butene. The liquid residue now consists of a mixture of aluminum dialkyl chlorides (in about 10% of the corresponding aluminum trialkyls) of the average composition:

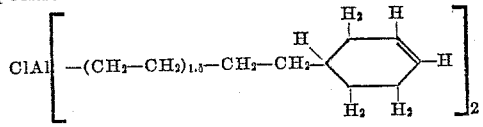

This organic aluminum compound is a good starting material for the production by oxidation of an alcohol mixture having the average composition:

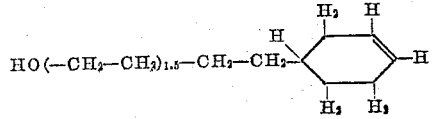

Information concerning the distribution of the various possible alkyl radicals is given by the following experiment:

The liquid residue is decomposed with methanol and hydrolyzed with dilute sulphuric acid. Some gas (ethane, butane) then escapes. After washing the hydrocarbon layer with water and drying over $CaCl_2$, the following composition was determined by gas chromatography:

|  | Percent |
|---|---|
| n-Butane | traces |
| n-Hexane | 5.5 |
| n-Octane | 3.1 |
| 1-ethyl-3-cyclohexene | 15.7 |
| 1-n-butyl-3-cyclohexene | 30.6 |
| 1-n-hexyl-3-cyclohexene | 24.4 |
| 1-n-octyl-3-cyclohexene | 15.6 |
| Of higher boiling point | 5 |

*Example 7*

A suspension of 1 g. of aluminum hydride in 102 g. of $(C_5H_{11})_2Al$—Cl is placed in a half-litre autoclave previously flushed out with nitrogen and thereafter 56 g. of ethylene are forced in under pressure. While shaking, the temperature of the autoclave is raised to 150° C., a reaction quickly taking place and the pressure reaching a minimum value after only 3 hours. After blowing off the residual gas at 100° C. and after vacuum treatment, in which a further small quantity of olefine is removed, the liquid reaction product (158 g.) is emptied out. It is a good starting material for the production by oxidation, of a mixture of primary alcohols with odd C-numbers from 5 up to about 17.

*Example 8*

66 g. of aluminum tribenzyl are mixed under nitrogen with 100 cc. of xylene. 38.2 g. of $NaAlCl_4$ are then added (this being less than the quantity of $NaAlCl_4$ necessary for the complete reaction) and the mixture is heated to 120° C. while stirring. Dibenzyl aluminum monochloride and sodium chloride are formed, the latter precipitating in a crystalline form and settling on the bottom of the vessel. The vessel is decanted, the solvent is then removed and the product placed in a 500 ml. autoclave. Instead of sodium aluminum tetrachloride, it is also possible to use the equivalent quantity of aluminum chloride, but the reaction of the complex chloride proceeds somewhat more gently.

Thereafter, 34 g. of ethylene are forced in under pressure and the autoclave is heated to 140° C. After 5 hours, the pressure has fallen to about 20 atm. The residual gas is blown off and the liquid mixture is emptied out. 3 g. of olefines are thereafter distilled off at a bath temperature of about 50° C. in vacuo. In order to control the composition of the reaction product, the reaction mixture can, in this case also, be hydrolyzed in the usual manner. In this way, hydrocarbon layer is obtained which, after being washed, dried and subjected to fine distillation on a rotating band column, yields:

| Toluene, B.P. 110° C. | 1-phenyl propane, B.P., 55° C./20 mm. Hg | 1-phenyl pentane, B.P., 85° C./20 mm. Hg | 1-phenyl heptane, B.P., 120° C./20 mm. Hg |
|---|---|---|---|
| G. 16 | G. 14 | G. 5.8 | G. 3.8 |

What we claim is:

1. Process for the conversion of organo-aluminum monohalide which comprises reacting an organo-aluminum monohalide free from unsaturated bonds on the carbon atom connected to the aluminum and having the general formula $XAlR_2$ in which R represents a hydrocarbon radical and X a halogen atom, with an olefin in the presence of a catalyst selected from the group consisting of aluminum trihydrocarbons, alkyl aluminum hydrides, and aluminum hydride, and recovering the organo-aluminum monohalide formed corresponding to said general formula in which R represents a hydrocarbon radical, differing from the hydrocarbon radical of the organo-aluminum monohalide initially reacted.

2. A process according to claim 1 in which said olefin is ethylene and in which said reaction is effected at a pressure above about 10 atmospheres and at a temperature between about 90 and 170 degrees C. and in which said recovered organo-aluminum monohalide is a higher homolog of the organo-aluminum monohalide initially reacted.

3. A process according to claim 2 in which said reaction is effected at a temperature of about 120–150 degrees C.

4. A process according to claim 1 in which said olefin is ethylene, and in which said recovered organo-aluminum monohalide is a higher homolog of the organo-aluminum monohalide initially reacted, and which includes heating the recovered organo-aluminum monohalide to a temperature above about 170 degrees C. to thereby split off an olefin.

5. A process according to claim 1 in which R in the general formula for the organo-aluminum monohalide initially reacted represents a hydrocarbon radical, having more than 3 carbon atoms, in which said olefin is ethylene, and which includes recovering a higher homolog of ethylene from the reaction mixture.

6. A process according to claim 1 in which said olefin is a higher homolog of ethylene and which includes recovering from the reaction mix an olefin corresponding to the radical R in the general formula of the initial organo-aluminum monohalide reacted.

7. A process according to claim 1 which includes splitting off olefins from the recovered organo-aluminum monohalide by heating in the presence of a nickel catalyst and a lower olefin.

8. A process according to claim 1 in which said catalyst is an aluminum trialkyl present in amount of about 1–5% based on the organo-aluminum monohalide reacted.

9. A process according to claim 1 which includes after the reaction converting the catalyst remaining in the reaction mix by reaction with a member selected from the group consisting of aluminum trihalides and monoalkyl aluminum dihalides.

10. A process according to claim 1 in which said formed organo-aluminum monohalide is recovered in the reaction mixture and which includes contacting the reaction mixture with a potassium halide to thereby form a complex potassium salt and thereafter distilling off olefins from the reaction mixture.

11. A process according to claim 10 which includes recovering the complex potassium salt and reacting the same with an organo-aluminum dihalide to thereby form an organo-aluminum monohalide corresponding to said general formula for reuse in the process.

12. A process according to claim 10 which includes converting the catalyst in the reaction mixture into organo-aluminum monohalide by reaction with an organo-aluminum dihalide prior to the addition of said potassium halide.

13. A process according to claim 1 in which X represents chlorine.

14. A process for the formation of olefins which comprises reacting an organo-aluminum monohalide free from unsaturated bonds on the carbon atom connected to the aluminum and having the general formula $XAlR_2$ in which R represents a hydrocarbon radical and X a halogen atom, with an olefin in the presence of a catalyst selected from the group consisting of aluminum trihydrocarbons, alkyl aluminum hydrides and aluminum hydride, to thereby form a reaction mixture containing an organo-aluminum monohalide corresponding to said general formula in which R represents a hydrocarbon radical differing from the hydrocarbon radical of the organo-aluminum monohalide initially reacted, and recovering an olefin differing from the starting olefin of the reaction mixture.

15. A process according to claim 14 in which said olefin is recovered by splitting the formed organo-aluminum monohalide.

16. A process according to claim 15 in which said initial olefin reacted is ethylene and in which the formed organo-aluminum monohalide is split at a temperature above 170 degrees C. and the recovered olefin is a higher homolog of ethylene.

References Cited in the file of this patent

FOREIGN PATENTS

| 770,707 | Great Britain | Mar. 20, 1957 |
| 23,966 IVb/12o | Germany | Oct. 18, 1956 |